United States Patent
Rehani et al.

(10) Patent No.: US 9,020,807 B2
(45) Date of Patent: Apr. 28, 2015

(54) FORMAT FOR DISPLAYING TEXT ANALYTICS RESULTS

(71) Applicant: DW Associates, LLC, Austin, TX (US)

(72) Inventors: Manu Rehani, Portland, OR (US); Warren L. Wolf, Austin, TX (US)

(73) Assignee: DW Associates, LLC, Austin, TX (US)

( * ) Notice: Subject to any disclaimer, the term of this patent is extended or adjusted under 35 U.S.C. 154(b) by 262 days.

(21) Appl. No.: 13/744,186

(22) Filed: Jan. 17, 2013

(65) Prior Publication Data

US 2013/0185058 A1    Jul. 18, 2013

Related U.S. Application Data

(60) Provisional application No. 61/588,054, filed on Jan. 18, 2012.

(51) Int. Cl.
  *G06F 17/27* (2006.01)
  *G06F 17/20* (2006.01)
  *G06F 17/21* (2006.01)

(52) U.S. Cl.
  CPC .......... *G06F 17/2785* (2013.01); *G06F 17/214* (2013.01)

(58) Field of Classification Search
  CPC ....................................................... G06F 17/02
  USPC .................................................. 704/1, 9, 10
  See application file for complete search history.

(56) References Cited

U.S. PATENT DOCUMENTS

| | | |
|---|---|---|
| 5,128,865 A | 7/1992 | Sadler |
| 5,249,967 A | 10/1993 | O'Leary et al. |
| 5,454,722 A | 10/1995 | Holland et al. |
| 5,533,181 A | 7/1996 | Bergsneider |
| 5,781,879 A | 7/1998 | Arnold et al. |
| 5,797,123 A | 8/1998 | Chou et al. |
| 5,857,855 A | 1/1999 | Katayama |
| 5,887,120 A | 3/1999 | Wical |
| 5,961,333 A | 10/1999 | Harrison et al. |
| 6,055,531 A * | 4/2000 | Bennett et al. ........................ 1/1 |
| 6,092,035 A * | 7/2000 | Kurachi et al. .................... 704/3 |
| 6,125,377 A * | 9/2000 | Razin ............................ 715/234 |
| 6,126,449 A | 10/2000 | Burns |
| 6,138,085 A | 10/2000 | Richardson et al. |
| 6,173,261 B1 | 1/2001 | Arai et al. |

(Continued)

FOREIGN PATENT DOCUMENTS

| | | |
|---|---|---|
| JP | 2002149675 | 5/2002 |
| JP | 2004102428 A | 4/2004 |

(Continued)

OTHER PUBLICATIONS

Employee Engagement What's Your Engagement Ratio? Gallup Consulting 2008.

(Continued)

*Primary Examiner* — Jesse Pullias

(74) *Attorney, Agent, or Firm* — Marger Johnson & McCollom PC

(57) ABSTRACT

A system can receive text. The text can be divided into various portions. One or more significance indicators can be associated with each portion of text: these significance indicators can also be received by the system. The system can then display a portion of text and the associated significance indicators to the user.

26 Claims, 4 Drawing Sheets

(56) References Cited

U.S. PATENT DOCUMENTS

| | | |
|---|---|---|
| 6,385,620 B1 | 5/2002 | Kurzius et al. |
| 6,453,315 B1 | 9/2002 | Weissman et al. |
| 6,504,990 B1 | 1/2003 | Abecassis |
| 6,523,026 B1 | 2/2003 | Gillis |
| 6,537,325 B1 * | 3/2003 | Nishizawa .............. 715/267 |
| 6,556,964 B2 | 4/2003 | Haug et al. |
| 6,620,207 B1 * | 9/2003 | Lin .................. 715/262 |
| 6,684,202 B1 | 1/2004 | Humphrey et al. |
| 7,403,890 B2 | 7/2008 | Roushar |
| 7,487,094 B1 | 2/2009 | Konig et al. |
| 7,539,697 B1 | 5/2009 | Akella et al. |
| 7,555,441 B2 | 6/2009 | Crow et al. |
| 7,565,403 B2 | 7/2009 | Horvitz et al. |
| 7,567,895 B2 | 7/2009 | Chen et al. |
| 7,607,083 B2 | 10/2009 | Gong et al. |
| 7,644,144 B1 | 1/2010 | Horvitz et al. |
| 7,711,573 B1 | 5/2010 | Obeid |
| 7,711,672 B2 | 5/2010 | Au |
| 7,720,675 B2 | 5/2010 | Burstein et al. |
| 7,792,685 B2 | 9/2010 | Andino, Jr. et al. |
| 7,801,840 B2 | 9/2010 | Repasi et al. |
| 7,813,917 B2 | 10/2010 | Shuster |
| 7,870,203 B2 | 1/2011 | Judge et al. |
| 7,873,595 B2 | 1/2011 | Singh et al. |
| 7,917,587 B2 | 3/2011 | Zeng et al. |
| 7,945,497 B2 | 5/2011 | Kenefick et al. |
| 7,966,265 B2 | 6/2011 | Schalk et al. |
| 8,090,725 B1 | 1/2012 | Cranfill |
| 2002/0059376 A1 | 5/2002 | Schwartz |
| 2002/0099730 A1 | 7/2002 | Brown et al. |
| 2002/0106622 A1 | 8/2002 | Osborne et al. |
| 2002/0143573 A1 | 10/2002 | Bryce et al. |
| 2003/0027121 A1 | 2/2003 | Grudnitiski et al. |
| 2003/0028564 A1 | 2/2003 | Sanfilippo |
| 2003/0093322 A1 | 5/2003 | Sciuk |
| 2003/0144868 A1 | 7/2003 | MacIntyre et al. |
| 2003/0167266 A1 | 9/2003 | Saldanha et al. |
| 2003/0182310 A1 | 9/2003 | Charnock et al. |
| 2004/0030556 A1 | 2/2004 | Bennett |
| 2004/0053203 A1 | 3/2004 | Walters et al. |
| 2004/0117234 A1 | 6/2004 | Lindsay-Scott et al. |
| 2005/0055209 A1 | 3/2005 | Epstein |
| 2005/0165600 A1 | 7/2005 | Kasravi et al. |
| 2005/0192949 A1 | 9/2005 | Kojima |
| 2005/0197890 A1 | 9/2005 | Lu et al. |
| 2005/0202871 A1 | 9/2005 | Lippincott |
| 2005/0204337 A1 | 9/2005 | Diesel et al. |
| 2005/0262428 A1 | 11/2005 | Little et al. |
| 2005/0272517 A1 | 12/2005 | Funk et al. |
| 2005/0282141 A1 | 12/2005 | Falash et al. |
| 2006/0047530 A1 | 3/2006 | So et al. |
| 2006/0206332 A1 | 9/2006 | Paek et al. |
| 2006/0230102 A1 | 10/2006 | Hidary |
| 2006/0235843 A1 | 10/2006 | Musgrove et al. |
| 2006/0246973 A1 | 11/2006 | Thomas et al. |
| 2006/0271872 A1 | 11/2006 | Shirai |
| 2007/0061179 A1 | 3/2007 | Henderson et al. |
| 2007/0112710 A1 | 5/2007 | Drane et al. |
| 2007/0135225 A1 | 6/2007 | Nieminen et al. |
| 2007/0196798 A1 | 8/2007 | Pryor et al. |
| 2007/0203720 A1 | 8/2007 | Singh et al. |
| 2007/0203991 A1 | 8/2007 | Fisher et al. |
| 2007/0213126 A1 | 9/2007 | Deutsch et al. |
| 2007/0259324 A1 | 11/2007 | Frank |
| 2007/0260421 A1 | 11/2007 | Berner et al. |
| 2007/0265089 A1 | 11/2007 | Robarts et al. |
| 2008/0027891 A1 | 1/2008 | Repasi et al. |
| 2008/0052283 A1 | 2/2008 | Jensen et al. |
| 2008/0097781 A1 | 4/2008 | Clarke et al. |
| 2008/0191864 A1 | 8/2008 | Wolfson |
| 2008/0208910 A1 | 8/2008 | MacIntyre et al. |
| 2008/0275744 A1 | 11/2008 | MacIntyre et al. |
| 2008/0281620 A1 | 11/2008 | Schalk et al. |
| 2008/0288306 A1 | 11/2008 | MacIntyre et al. |
| 2008/0288889 A1 | 11/2008 | Hunt et al. |
| 2008/0300930 A1 | 12/2008 | Compitello et al. |
| 2008/0319829 A1 | 12/2008 | Hunt et al. |
| 2009/0006156 A1 | 1/2009 | Hunt et al. |
| 2009/0006164 A1 | 1/2009 | Kaiser et al. |
| 2009/0018996 A1 | 1/2009 | Hunt et al. |
| 2009/0024554 A1 | 1/2009 | Murdock et al. |
| 2009/0024747 A1 | 1/2009 | Moses et al. |
| 2009/0035736 A1 | 2/2009 | Wolpert et al. |
| 2009/0187446 A1 | 7/2009 | Dewar |
| 2009/0198488 A1 | 8/2009 | Vigen |
| 2009/0248399 A1 | 10/2009 | Au |
| 2009/0282104 A1 | 11/2009 | O'Sullivan et al. |
| 2009/0287672 A1 | 11/2009 | Chakrabarti et al. |
| 2009/0292541 A1 | 11/2009 | Daya et al. |
| 2009/0319508 A1 | 12/2009 | Yih et al. |
| 2009/0327208 A1 | 12/2009 | Bittner et al. |
| 2010/0023377 A1 | 1/2010 | Sheridan |
| 2010/0098289 A1 | 4/2010 | Tognoli |
| 2010/0100496 A1 | 4/2010 | Baldwin et al. |
| 2010/0131418 A1 | 5/2010 | McCagg et al. |
| 2010/0145678 A1 | 6/2010 | Csomai et al. |
| 2010/0153288 A1 | 6/2010 | Digiambattista et al. |
| 2010/0179845 A1 | 7/2010 | Davidson |
| 2010/0179916 A1 | 7/2010 | Johns et al. |
| 2010/0228733 A1 | 9/2010 | Harrison et al. |
| 2010/0274636 A1 | 10/2010 | Sheridan |
| 2010/0306251 A1 | 12/2010 | Snell |
| 2011/0040837 A1 | 2/2011 | Eden et al. |
| 2011/0055098 A1 | 3/2011 | Stewart |
| 2011/0184939 A1 | 7/2011 | Elliott |
| 2011/0208511 A1 | 8/2011 | Sikstron et al. |
| 2011/0258049 A1 | 10/2011 | Ramer et al. |
| 2011/0295759 A1 | 12/2011 | Selvakummar et al. |
| 2013/0185058 A1 | 7/2013 | Rehani et al. |

FOREIGN PATENT DOCUMENTS

| | | | | |
|---|---|---|---|---|
| JP | 2004157931 | | 6/2004 | |
| JP | 2006-061632 A | * | 3/2006 | .............. A61B 5/16 |
| JP | 2007249322 A | | 9/2007 | |
| JP | 2006061632 A | | 3/2009 | |
| WO | 2004055614 A2 | | 7/2004 | |
| WO | 2008148819 | | 12/2008 | |
| WO | 2012000013 | | 1/2012 | |

OTHER PUBLICATIONS

Schaufell, Wilmar B. et al. "The Measure of Work Engagement with a Short Questionnaire." A Cross-National Study. Educational and Psychological Measurement. vol. 66, No. 4. Aug. 2006.

Performance Optimization Framework Value Proposition. Introduction and Overview. Knowledge Advisors. Copyright 2009.

Kular, S. et al., Employee Engagement: A Literature Review. Kingston University, Kingston Business School. Working Paper Series No. 19. Oct. 2008.

Richards, David. Hellmann HR Team Instills Values and Behaviors. Strategic HR Review, 2008, 7, 4.

Parks, Louise et al. "A Test of the Importance of Work-Life Balance for Employee Engagement and Intention to Stay in Organisations." Journal of Management and Organization. vol. 14, Issue 3, Jul. 2008.

McBain, R. "The Practice of Engagement." Strategic HR Review. Sep./Oct. 2007; 6; 6.

Moon, K. et al., "Emotional States Recognition of Text Data Using Hidden Markov Models." Proceedings of 2001 Autumn KISS. 2001. vol. 28, No. 2, pp. 127-129.

International Search Report from PCT/US2012/036330, published as WO2012158357 on Nov. 22, 2012, 3 pages.

International Search Report from PCT/US2011/058444, published as WO2012061254 on May 10, 2012, 3 pages.

International Search Report from PCT/US2011/058435, published as WO2012061252 on May 10, 2012, 8 pages.

Hyun-Ku Moon et al. "Emotional States Recognition of Text Data Using Hidden Markov Models," Proceedings of 2001 Autumn KISS, 2001, vol. 28 No. 2, pp. 127-129.

International Search Report and Written Opinion for PCT Application No. PCT/US2013/022072, dated Jun. 11, 2013, 5 pages.

(56) References Cited

OTHER PUBLICATIONS

Lingway Vertical Search Solutions, Lingway HR Suite, "Lingway e-Recruitment Applications: a Semantic Solution for Recruitment", retrieved from http://www.lingway.com/images/pdf/fichelhrslea07anglaisweb.pdf on Jun. 17, 2012 (2 pages).

Tseng, "Semantic Classification of Chinese unknown words", ACL '03 Proceedings of the 41st Annual Meeting on Association for Computational Linguistics—vol. 2 Association for Computational Linguistics Stroudsburg, Pa, USA © 2003.

Mohammad, "Measuring Semantic Distance Using Distributional Profiles of Concepts", a thesis submitted in conformity with the requirements for the degree of Graduate Department of Computer Science University of Toronto, 2008, pp. 1-167.

Mohammad, et al., "Measuring Semantic Distance Using Distributional Profiles of Concepts", Association for Computational Linguistics; retrieved at http://www.umiacs.umd.edu/~saif/WebDocs/Measuring-Semantic-Distance.pdf, 2006, pp. 1-34.

Office Action dated May 5, 2009, U.S. Appl. No. 11/419,324, filed May 19, 2006 entitled "System and Method for Authoring and Learning".

Van Rijk, R et al., Using CrisisKit and MOPED to Improve Emergency Management Team Training, Proceedings ISCRAM 2004, Brussels, May 3-4, 2004. pp. 161-166.

Thomas, P.G. et al., AESOP—An Electronic Student Observatory Project, Frontiers in Education, 1998, 5 pages.

Loftin, R.B. et al., Training the Hubble Space Telescope Flight Team, IEEE Computer Graphics and Applications, 1995, pp. 31-37.

Office Action dated Jun. 16, 2008, U.S. Appl. No. 11/419,317, filed May 19, 2006 entitled "Method for Interactive Training and Learning."

Office Action dated Oct. 31, 2008, U.S. Appl. No. 11/419,317, filed May 19, 2006 entitled "Method for Interactive Training and Learning."

Office Action dated Jun. 16, 2009 U.S. Appl. No. 11/419,317, filed May 19, 2006 entitled "Method for Interactive Training and Learning."

Office Action dated Nov. 17, 2009 U.S. Appl. No. 11/419,317, filed May 19, 2006 entitled "Method for Interactive Training and Learning."

Aiolli, Fabio; Sebastiani, Fabrizio; Sperduti, Alessandro, Preference Learning for Category-Ranking Based Interactive Text Cagegorization, Proceedings of International Joint Conference on Neural Networks, ICJNN 2007, Orlando, FL, Aug. 12-17, 2007, pp. 2034-2039.

Mood Indicator Based on History of Electronic Communication Thread, IPCOM, Disclosure No. IPCOM000198194D, Jul. 29, 2010, 3 pages, retrieved from http://ip.com/IPCOM/000198194.

Keh, Huan-Chao, The Chinese Text Categorization System with Category Priorities, Journal of Software, Oct. 2010, vol. 5, No. 10, pp. 1137-1143.

R. Hawkins and M. Russell, Document Categorization Using Lexical Analysis and Fuzzy Sets, IBM Technical Disclosure Bulletin, Jun. 1992, vol. 35, No. 1A, 1 pg.

\* cited by examiner

FORMAT FOR DISPLAYING TEXT ANALYTICS RESULTS

RELATED APPLICATION DATA

This application claims the benefit of U.S. Provisional Patent Application Ser. No. 61/588,054, titled "METHOD AND SYSTEM FOR GRAPHICALLY ANALYZING TEXT AND DISPLAYING RESULTS THEREOF", filed Jan. 18, 2012, which is herein incorporated by reference for all purposes.

FIELD

This invention pertains to information, and more particularly to easier interpretation of text.

BACKGROUND

The world is awash in information. Millions of emails, websites, blogs, journals, reports, commentary, talks, business proposals, opinion columns, social networks, and the like, contribute to the vastness and extent of the information. Making sense of the information can be a challenge.

Information is often transmitted, recorded, displayed, or otherwise stored in textual form. Conventionally, to obtain a good comprehension of the information, a human must read and understand the text. Quite often, even after reading the text, humans may not understand the significance of the language used, the inflection points, the shifts in reasoning, the motivations behind the text, the rational interests underpinning the text, and so forth. Typically, to gain a complete understanding of the text, much time and effort must be expended, and even then, the significance of different portions of the text can be lost on the reader.

A need remains for a way to address these and other problems associated with the prior art.

DETAILED DESCRIPTION

Figure 1:
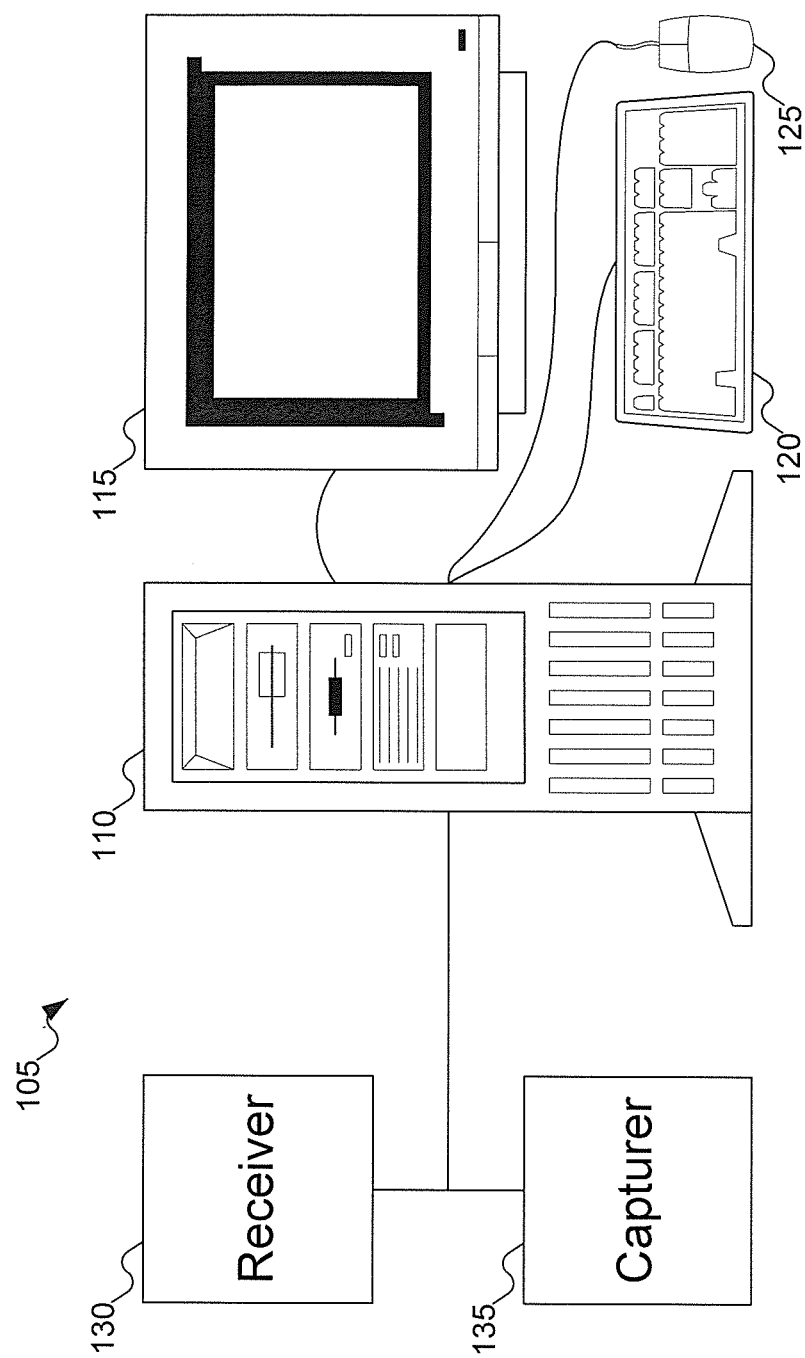
FIG. 1 shows a system to provide a user with greater understanding of text than the user would get with the text alone, according to an embodiment of the invention.

FIG. 1 shows a system to provide a user with greater understanding of text than the user would get with the text alone, according to an embodiment of the invention. FIG. 1 shows machine 105, which can be, for example, a server or a user's personal computer. In FIG. 1, machine 105 is shown as including computer 110, monitor 115, keyboard 120, and mouse 125. A person skilled in the art will recognize that other components can be included with machine 105: for example, other input/output devices, such as a printer. In addition, FIG. 1 machine 105 can include conventional internal components (not shown): for example, a central processing unit, a memory, storage, etc. Although not shown in FIG. 1, a person skilled in the art will recognize that machine 105 can interact with other machine, either directly or over a network (not shown) of any type. Finally, although FIG. 1 shows machine 105 as a conventional desktop computer, a person skilled in the art will recognize that computer system 105 can be any type of machine or computing device capable of providing the services attributed herein to machine 105, including, for example, a laptop computer, a personal digital assistant (PDA), or a cellular telephone.

Machine 105 also includes receiver 130. Receiver 130 can receive information from various sources, such as over a network. In particular, receiver 130 can receive text and significance indicators, to be displayed to a user, as discussed below.

Given a document, the document can be divided into portions of text. Each chunk of text can correspond, for example, to a paragraph, a phrase, a word, a fact, a thought, a sentence, a group of words, or any combination thereof. Each portion of text can be associated with one or more significance indicators. A significance indicator can include, for example, a motivational vested interest value, a rational vested interest value, an inflection point, a shift in reasoning, a level of emotion, a behavior, a score, or the like. In short, a significance indicator is metadata about the portion of text, giving the user insight into the author's meaning/intent/mindset/etc. when creating the portion of text. A figure included in a document is not a significance indicator: a figure included in the document gives the user additional insight into the subject of the document, but not into the author's meaning/intent/mindset/etc.

Once significance indicators are associated with portions of text in the document, the document and the significance indicators can be displayed to the user. Significance indicators can be displayed to the user in numerous different ways. In one embodiment of the invention, the significance indicators associated with a portion of text can be overlaid on portion of text. In another embodiment of the invention, the significance indicators associated with a portion of text can be displayed alongside the portion of text. In yet another embodiment of the invention, the significance indicators associated with a portion of text can be conveyed in the formatting of the text itself, such as degrees of font size, font selection, spacing, text opacity, font color, background color, or indicators such as italics, bold text, underlining, or highlighting, among other possibilities. A person of ordinary skill in the art will recognize other ways in which the significance indicators associated with a portion of text can be displayed to the user with the portion of text. In this manner, the reader can grasp and appreciate both the text and the significance indicators at the same time. Each chunk of text can be instantly perceived to have a particular significance of one sort or the other, as described above. The reader can therefore obtain a deeper understanding of the textual information, in particular, those sections or chunks of the textual information having special significance or importance Significance indicators can take any desired form. Example forms of significance indicators can include graphical waveforms or other suitable graphical insignia or numerical information.

While the above discussion refers to a "document", a person of ordinary skill in the art will recognize that embodiments of the invention are not limited to documents that can be edited using word processing software. The term "document" is intended to include any textual source, including, for example, news articles, web sites, and transcriptions of recordings, among other possibilities.

Figure 2:
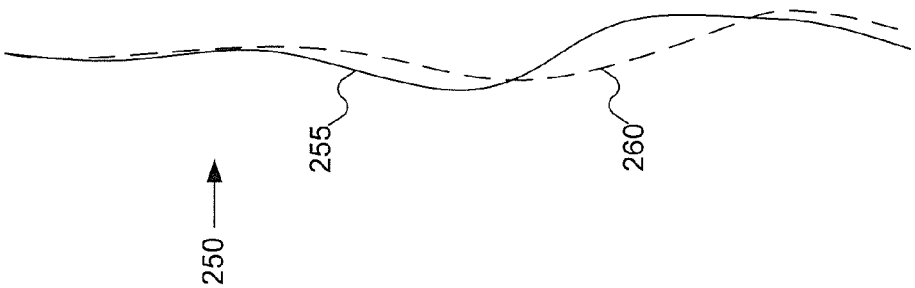
FIG. 2 shows portions of text with associated significance indicators for display in the system of FIG. 1.
Figure 3:
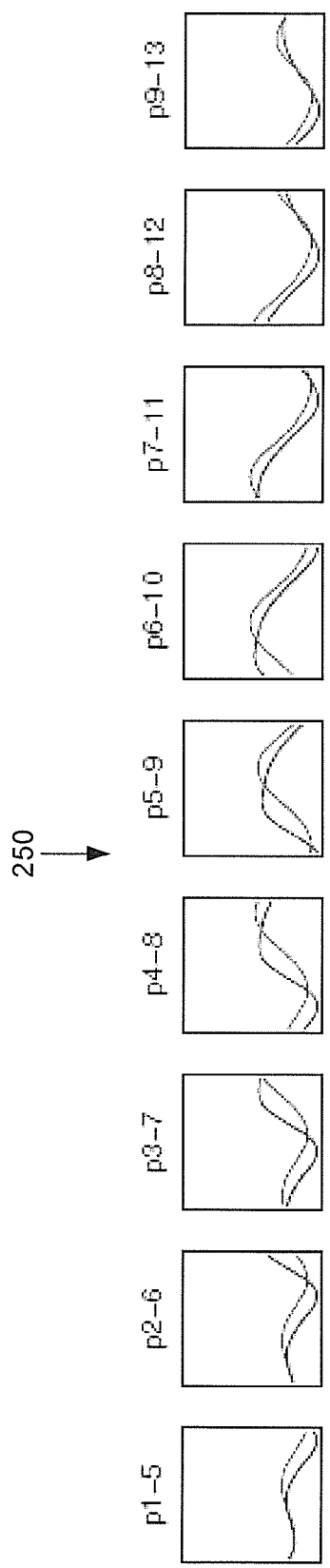
FIG. 3 shows significance indicators presented to the user in another manner in the system of FIG. 1.

FIG. 2 shows portions of text with associated significance indicators for display in the system of FIG. 1. In FIG. 2, text 205 is divided into portions of text 210, 215, 220, 225, 230, 235, 240, and 245. (Text 205 is taken from an article published in the Washington Post on Jan. 15, 2012, and continues beyond what is shown in FIG. 2.) Alongside text 205 is significance indicator 250, which is a graphical waveform showing two distinct graphs 255 and 260, plotted alongside the text of the article. Although shown as a one graph combining two graphical waveforms, significance indicator 250 can be divided into numerous individual significance indicators, each associated with a portion of text. For example, FIG. 3 shows nine graphical waveforms, each associated with a subset of the portions of text. When assembled, the individual significance indicators form significance indicator 250 shown in FIG. 2.

In significance indicator 250, two different waveforms 255 and 260 are shown. One waveform can represent, for example, the heart rate of the author at the time the portion of text was written, and the other waveform can represent, for example, the blood pressure reading of the author at the time the portion of text was written. Appropriate scales (not shown in FIG. 2) can be used to let the user know the significance of the various waveforms in the significance indicator.

Returning to FIG. 1, as discussed above, the significance indicators can be received using receiver 130. In another embodiment, the significance indicators can be captured by capturer 135. For example, continuing the example of heart rates and blood pressure rates as significance indicators, capturer 135 can include the necessary hardware to capture this information, as the corresponding portions of text are input machine 105. The author can be "hooked up" to heart and blood pressure monitoring equipment, to capture this information in real time as the author inputs the portions of text.

While FIG. 1 shows capturer 135 as part of machine 105 that receives the text, a person of ordinary skill in the art will recognize that capturer 135 can be part of one machine used by the author of the text, and separate from machine 105 as used by the reader of the text.

In yet another embodiment, the significance indicators can be derived from the portions of text themselves, by analysis of the text. For example, a semantic analysis of the text (as known in the art or developed in the future) can be used to derive the significance indicators.

The portions of text and the associated significance indicators can be output in any desired manner. They can be output to display 115. Or the output can be a file, such as a PDF file. Or the output can be printed onto paper. Or the output can be stored in a storage medium, such as a hard disk drive, memory, or other suitable storage device. Or, the output can be provided or otherwise implemented via a web browser toolbar, client user interface, software as a service (SAS) interface, or the like.

In some embodiments, the output can be transmitted over a network. In some embodiments, the output 105 can provide interactivity, or in other words, can receive information from the reader or user, and/or otherwise output different or changing information to the reader or user. In some embodiments, the output can be static so that once it is generated, it cannot be changed or tampered with.

Figure 4:
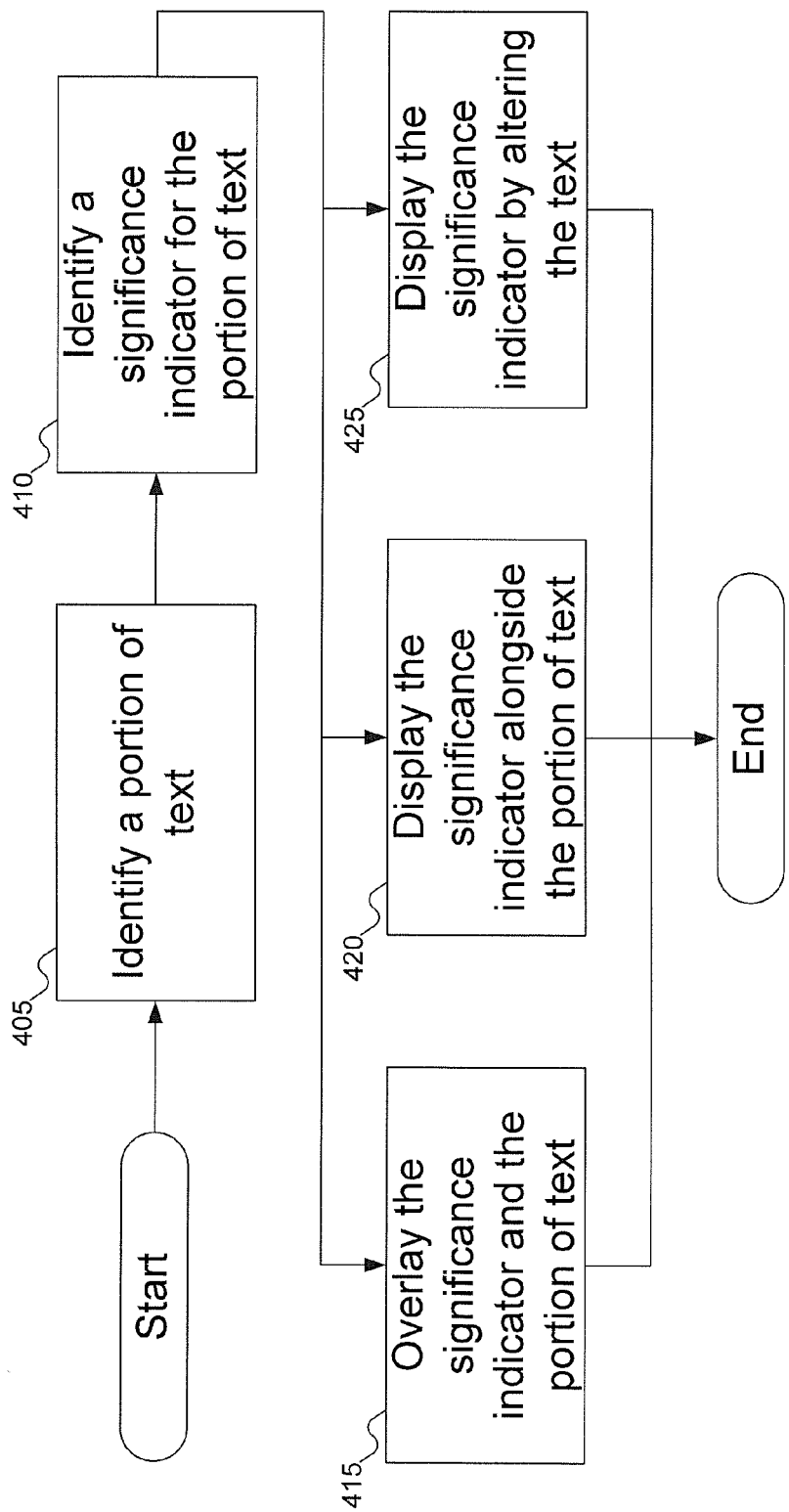
FIG. 4 shows a flowchart of a procedure for displaying significance indicators with text in the system of FIG. 1.

FIG. 4 shows a flowchart of a procedure for displaying significance indicators with text in the system of FIG. 1. In FIG. 4, at block 405, a portion of text is identified. At block 410, a significance indicator for the portion of text is identified. At block 415, the portion of text can be overlaid by the significance indicator. Alternatively, at block 420, the significance indicator can be displayed alongside the portion of text. Or alternatively, at block 425, the significance indicator can be displayed by altering the text itself. For example, the significance indicator can be displayed by changing the font, font size, text color, line spacing, or spacing between words, or by bolding or italicizing the text, among other possibilities.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 810.11, Bluetooth, optical, infrared, cable, laser, etc.

The invention claimed is:

1. A system, comprising:
a receiver to receive a portion of text;
a capturer to capture a significance indicator for the portion of text, where the significance indicator includes metadata about the portion of text; and
a display to display the portion of text and the significance indicator.

2. A system according to claim 1, wherein the display is operative to overlay the portion of text with the significance indicator.

3. A system according to claim 1, wherein the display is operative to display the significance indicator alongside the portion of text.

4. A system according to claim 1, wherein the display is operative to display the significance indicator by altering the portion of text.

5. A system according to claim 4, wherein the display is operative to display the significance indicator by altering the portion of text by changing at least one of a font, a font size, a text color, a text bold attribute, a text italics attribute, a line spacing, or a word spacing.

6. A system according to claim 1, wherein the significance indicator is drawn from a set consisting of a motivational vested interest value, a rational vested interest value, an inflection point, a shift in reasoning, a level of emotion, and a score.

7. A system according to claim 1, wherein:
the capturer is operative to capture at least two significance indicators for the portion of text, wherein each of the significance indicators includes metadata about the portion of text; and
the display is operative to display the portion of text and each of the significance indicators at the same time.

8. A system according to claim 7, wherein the display is operative to display the significance indicator by altering the portion of text by changing at least one of a font, a font size, a text bold attribute, a text italics attribute, a line spacing, or a word spacing.

9. A system according to claim 7, wherein the display is operative to display each of the significance indicators by altering the portion of text in a different way.

10. A method, comprising:
identifying a portion of text with a computer;
capturing a significance indicator for the portion of text, where the significance indicator includes metadata about the portion of text; and
displaying the portion of text and the significance indicator.

11. A method according to claim 10, wherein displaying the significance indicator with the portion of text includes displaying the significance indicator alongside the portion of text.

12. A method according to claim 10, wherein displaying the significance indicator with the portion of text includes overlying the portion of text with the significance indicator.

13. A method according to claim 10, wherein displaying the significance indicator with the portion of text includes altering the portion of text.

14. A method according to claim 13, wherein altering the portion of text includes changing at least one of a font, a font size, a text color, a text bold attribute, a text italics attribute, a line spacing, or a word spacing.

15. A method according to claim 10, wherein capturing a significance indicator for the portion of text includes capturing the significance indicator for the portion of text where the significance indicator is drawn from a set consisting of a motivational vested interest value, a rational vested interest value, an inflection point, a shift in reasoning, a level of emotion, and a score.

16. A method according to claim 10, wherein:
capturing a significance indicator for the portion of text includes capturing at least two significance indicators for the portion of text, where each of the significance indicators include metadata about the portion of text; and
displaying the portion of text and the significance indicator includes displaying the portion of text and each of the significance indicators at the same time.

17. A method according to claim 16, wherein displaying the significance indicator with the portion of text includes altering the portion of text by changing at least one of a font, a font size, a text bold attribute, a text italics attribute, a line spacing, or a word spacing.

18. A method according to claim 16, wherein displaying the portion of text and each of the significance indicators at the same time includes displaying the portion of text and each of the significance indicators at the same time, each of the significance indicators displayed in a different way.

19. An article, comprising a non-transitory storage medium, said non-transitory storage medium having stored thereon instructions that, when executed by a machine, result in:
identifying a portion of text with a computer;
capturing a significance indicator for the portion of text, where the significance indicator includes metadata about the portion of text; and
displaying the portion of text and the significance indicator.

20. An article according to claim 19, wherein displaying the significance indicator with the portion of text includes displaying the significance indicator alongside the portion of text.

21. An article according to claim 19, wherein displaying the significance indicator with the portion of text includes overlying the portion of text with the significance indicator.

22. An article according to claim 19, wherein displaying the significance indicator with the portion of text includes altering the portion of text.

23. An article according to claim 19, wherein capturing a significance indicator for the portion of text includes capturing the significance indicator for the portion of text where the significance indicator is drawn from a set consisting of a motivational vested interest value, a rational vested interest value, an inflection point, a shift in reasoning, a level of emotion, and a score.

24. An article according to claim 19, wherein:
capturing a significance indicator for the portion of text includes capturing at least two significance indicators for the portion of text, where each of the significance indicators include metadata about the portion of text; and
displaying the portion of text and the significance indicator includes displaying the portion of text and each of the significance indicators at the same time.

25. An article according to claim 24, wherein displaying the significance indicator with the portion of text includes altering the portion of text by changing at least one of a font, a font size, a text bold attribute, a text italics attribute, a line spacing, or a word spacing.

26. An article according to claim 24, wherein displaying the portion of text and each of the significance indicators at the same time includes displaying the portion of text and each of the significance indicators at the same time, each of the significance indicators displayed in a different way.

* * * * *

UNITED STATES PATENT AND TRADEMARK OFFICE
CERTIFICATE OF CORRECTION

PATENT NO.         : 9,020,807 B2  
APPLICATION NO.    : 13/744186  
DATED              : April 28, 2015  
INVENTOR(S)        : Manu Rehani et al.

Page 1 of 1

It is certified that error appears in the above-identified patent and that said Letters Patent is hereby corrected as shown below:

In column 4, line 37, insert the following three paragraphs at the end of the specification:

--The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other non-transitory storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "in one embodiment" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.--

Signed and Sealed this  
Twenty-third Day of February, 2016

Michelle K. Lee  
*Director of the United States Patent and Trademark Office*